Dec. 15, 1970   M. P. CHAPLIN   3,546,858
HARVESTING MARINE GROWTHS
Filed Feb. 10, 1969   6 Sheets-Sheet 1
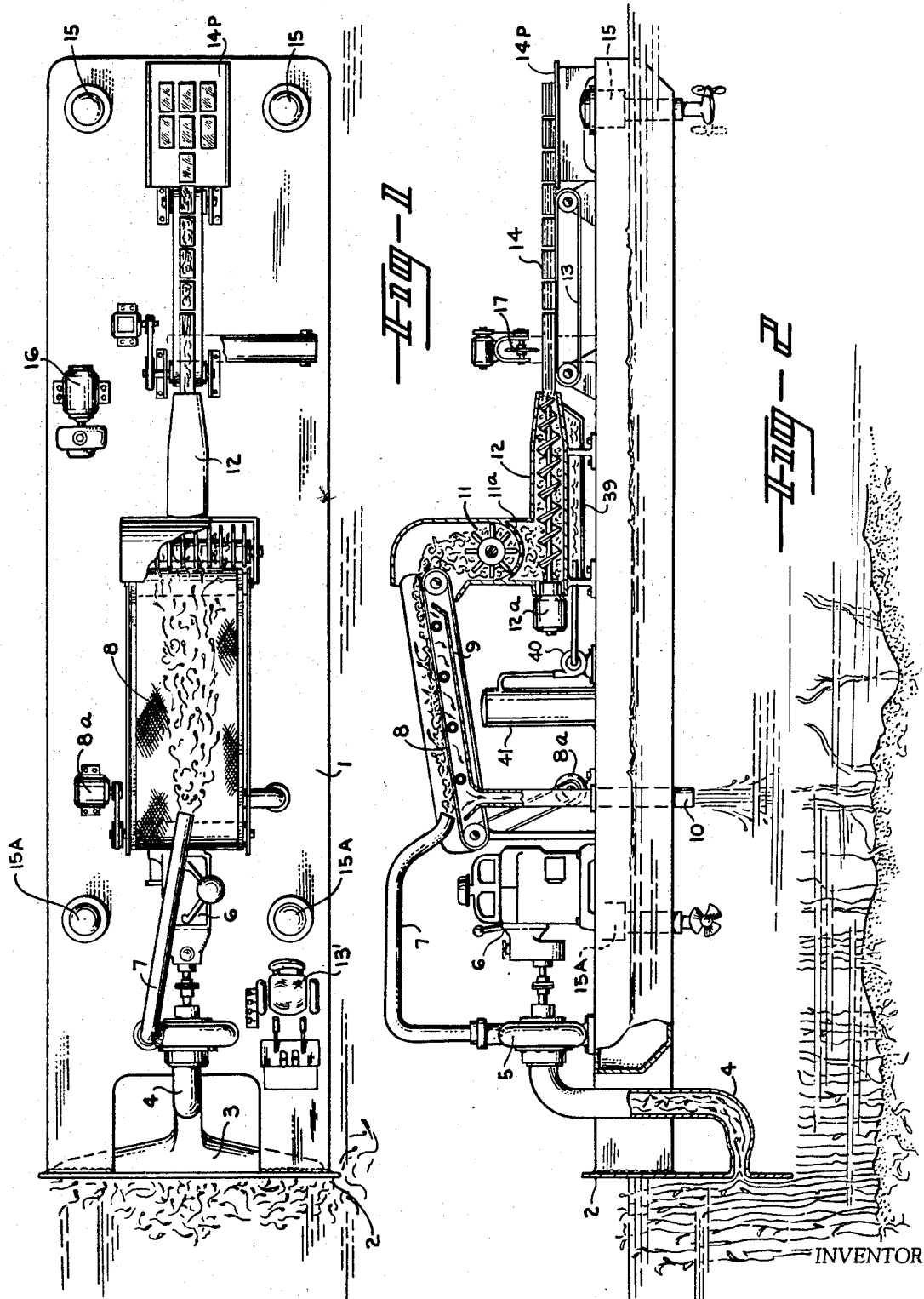
INVENTOR
MERLE P. CHAPLIN
BY *Julian L. Renfro*
ATTORNEY

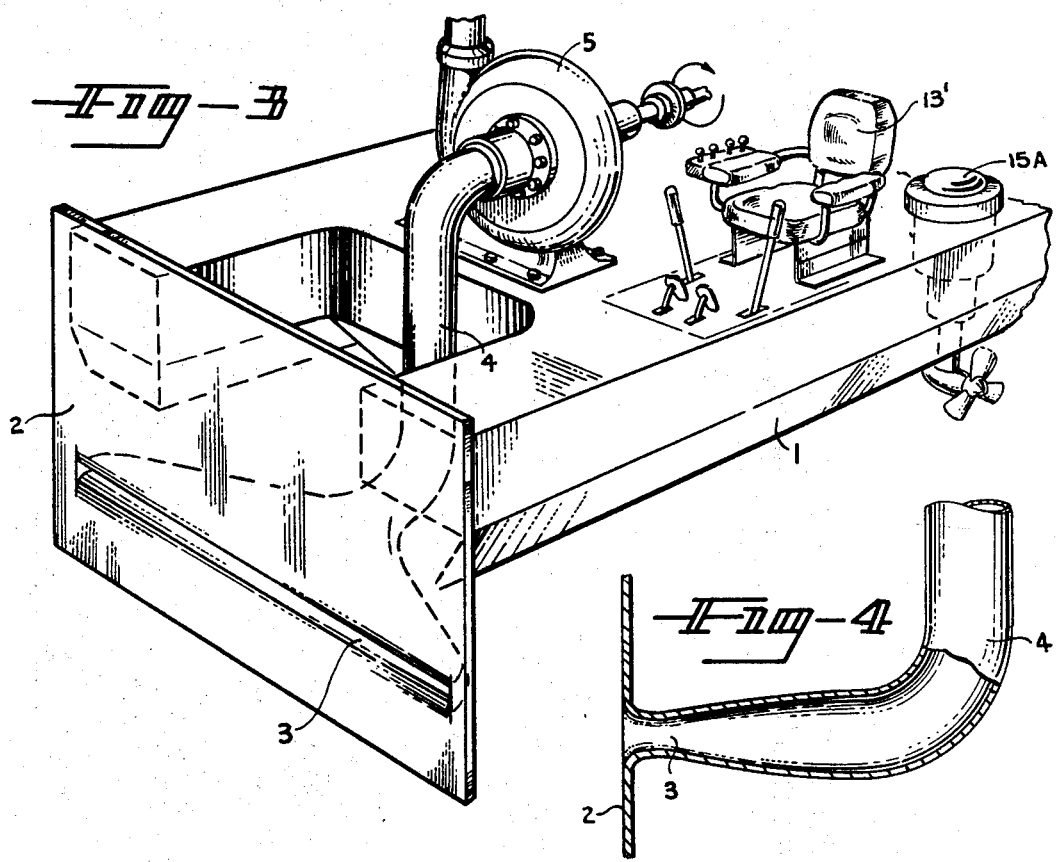
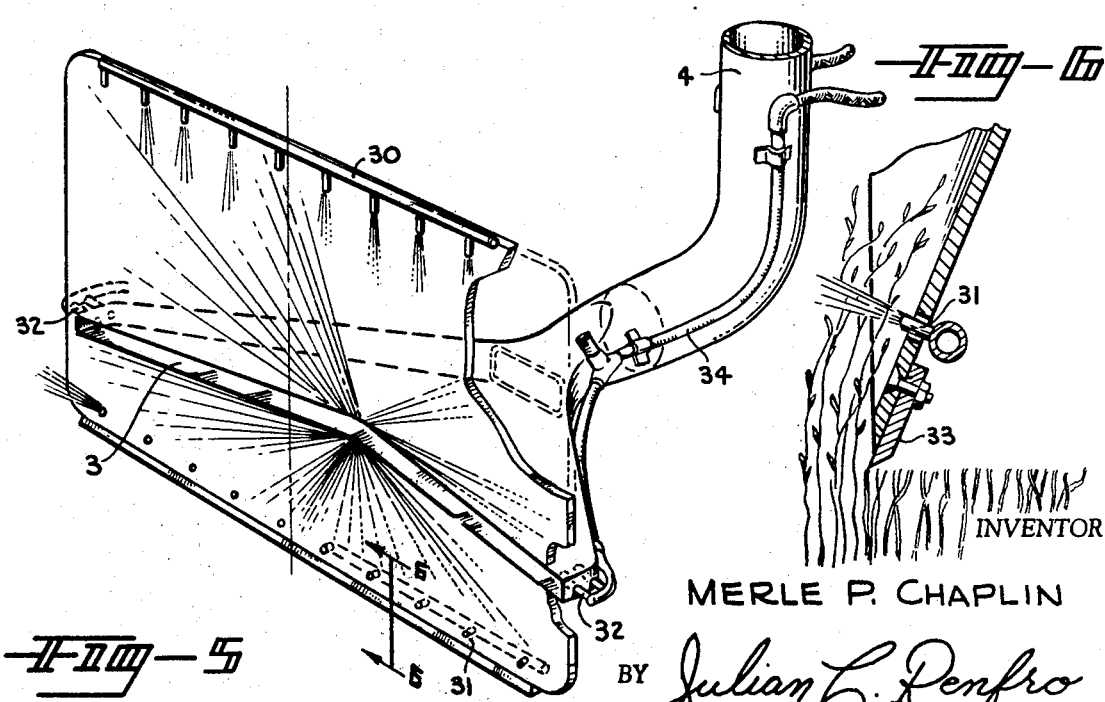

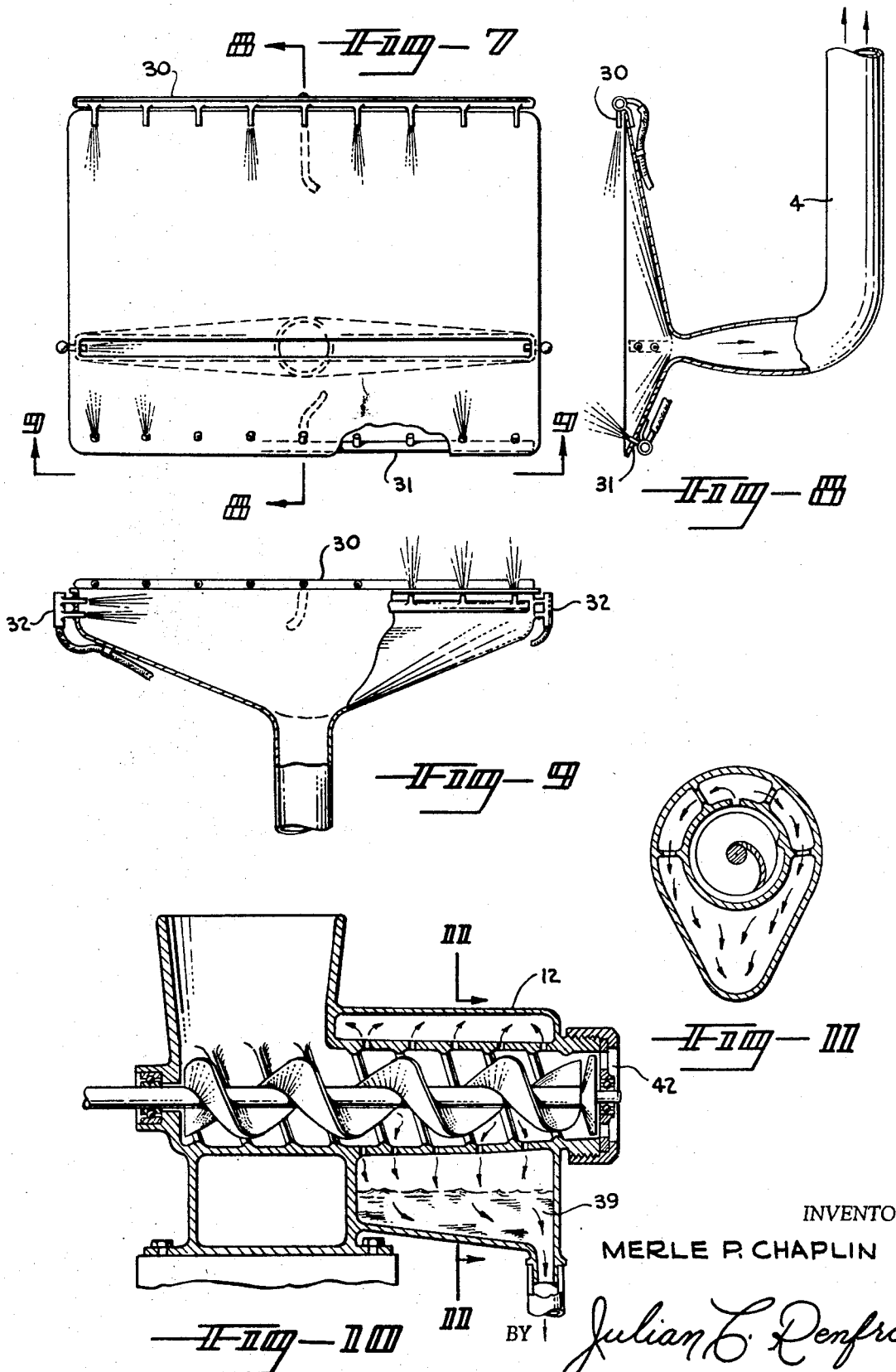

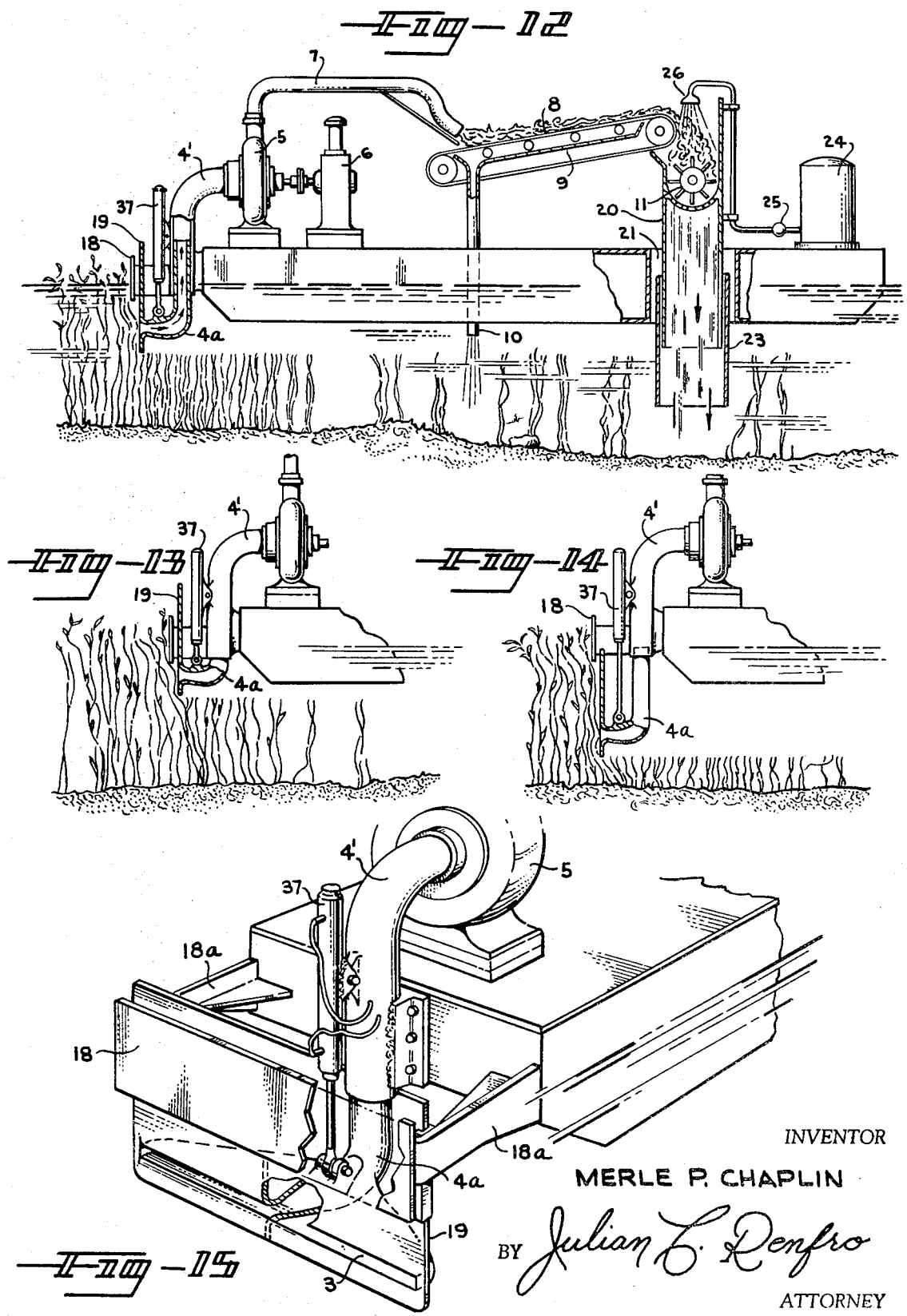

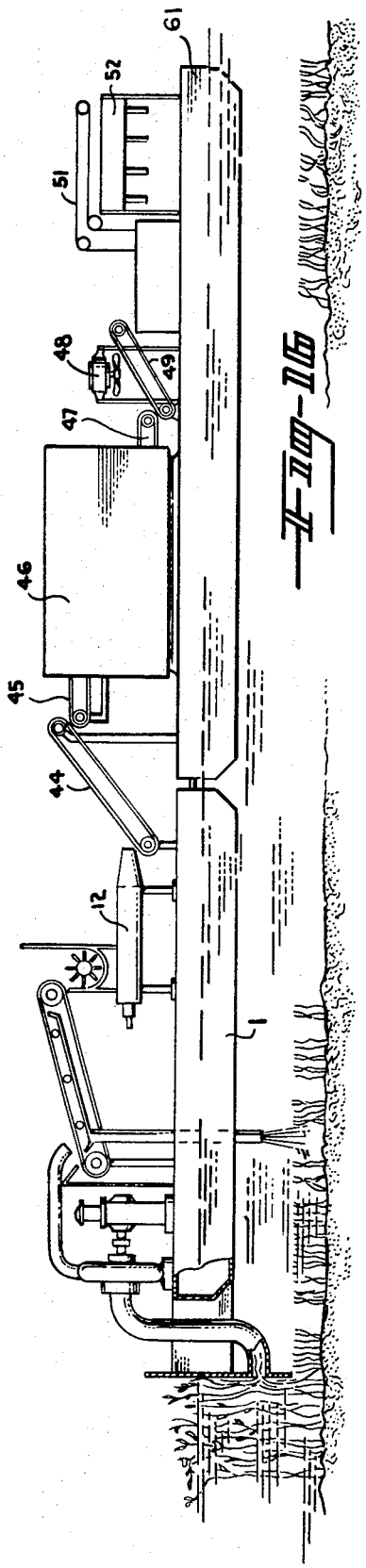
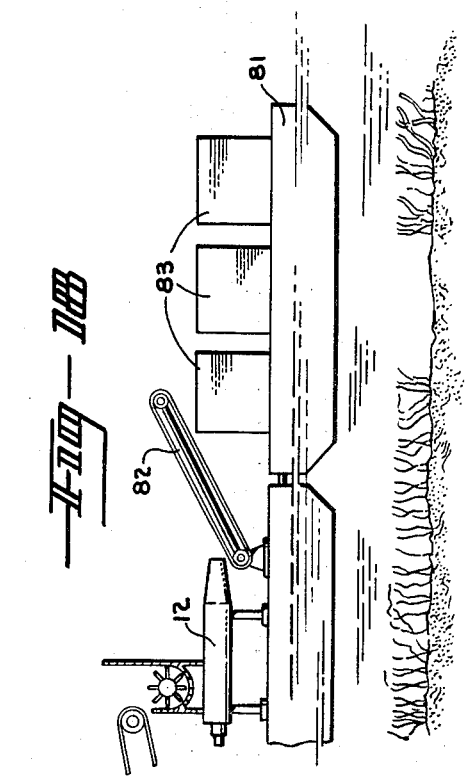
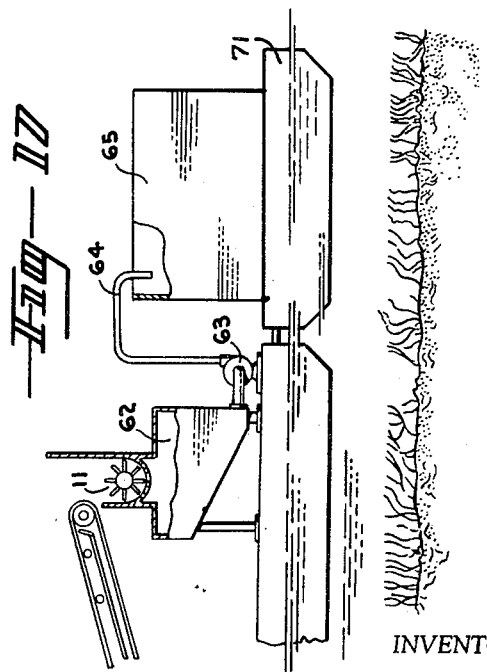
INVENTOR
MERLE P. CHAPLIN
BY *Julian C. Renfro*
ATTORNEY

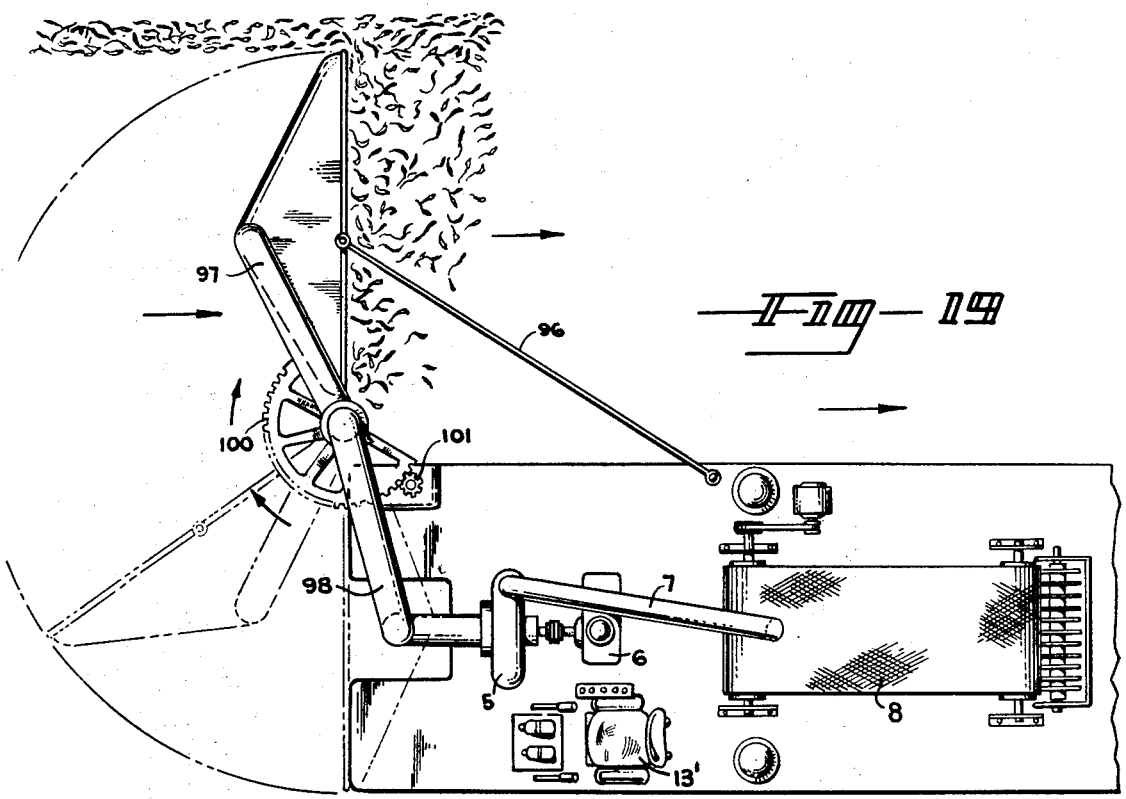
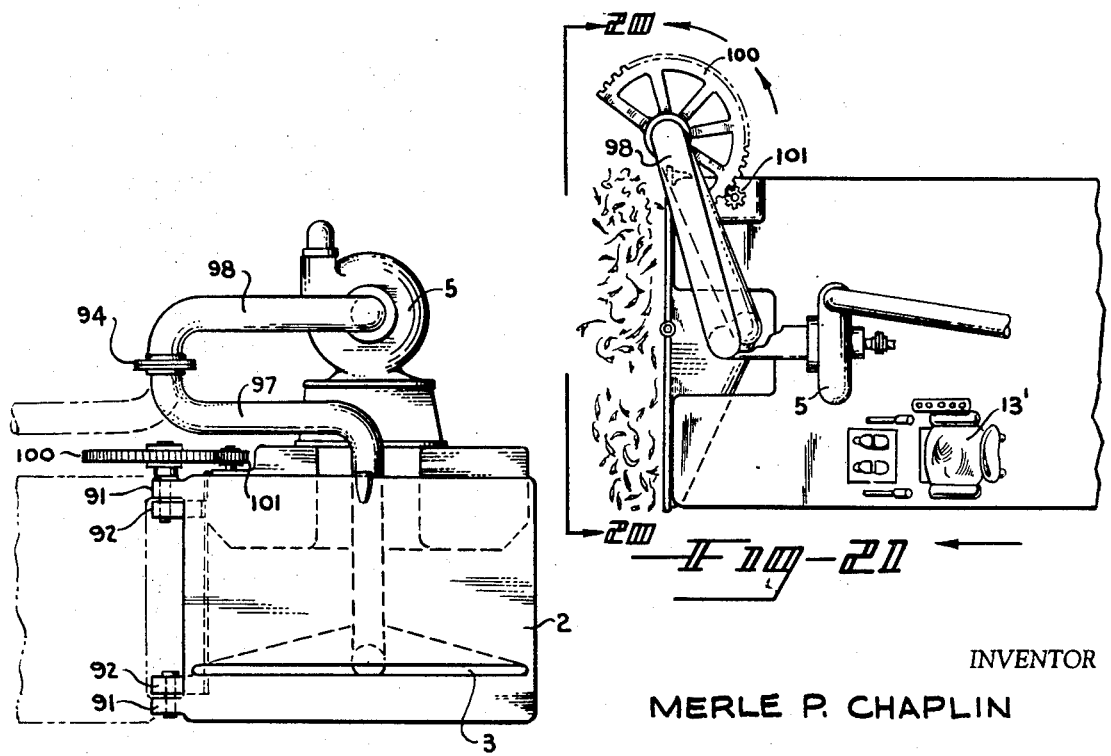

United States Patent Office 3,546,858
Patented Dec. 15, 1970

3,546,858
HARVESTING MARINE GROWTHS
Merle P. Chaplin, 609 Driver Ave.,
Winter Park, Fla. 32789
Filed Feb. 10, 1969, Ser. No. 798,066
Int. Cl. A01d 45/08
U.S. Cl. 56—9                                    11 Claims

ABSTRACT OF THE DISCLOSURE

A method and apparatus for harvesting marine growths from a body of water utilizing a floating structure at one end of which is a partially submerged inlet member containing an intake opening through which marine growths may be drawn. Contained on the floating structure may be pump means for pulling the weeds in through the opening, as well as various means for converting the harvested materials and their various constituents into a condition whereby they may be readily transported to other locations or to receive further treatment for ultimate disposal or use. Various processing means on the structure may be utilized, depending on the specific need or objective. Advantageously, my invention comprehends the use of means for selectively varying the depth of the intake opening, as well as means for swinging the inlet member into a rearward facing direction, thus obviating the need for turning the floating structure around when a return path across the lake or other body of water is desired.

REFERENCE TO RELATED DEVICES

This invention bears a relationship to my U.S. Pat. No. 3,412,862 entitled "Method and Apparatus for Cleaning Areas Overlain by a Water Body," which issued Nov. 26, 1968, and to my pending application Ser. No. 764,586 entitled "Technique for Removing Marine Growths and Roots."

Each of these earlier devices as well as the instant invention involves the use of a manned floating structure having components or accessories by the use of which certain undesirable ingredients or growths may be removed from a basin or body of water.

BACKGROUND OF THE INVENTION

Field of the invention

This invention pertains to the removal of marine growths from a basin of water such as a lake, pond, river or other body of water, and more particularly to an arrangement for harvesting marine growths in a selective and optimum manner, and then processing same as may be appropriate.

Description of the prior art

Devices for harvesting marine growths are of recognized utility, both from the standpoint of clearing streams and rivers for navigational reasons, as well as for reasons of crop value.

In many areas, marine growths in Florida have gotten out of hand and have spread rapidly over lakes and streams, interferring with boating, fishing, bathing and other water activities. This increase of water growths has, in part, been due to the increase in the number and size of storm sewers which empty into land locked lakes, and leave large deposits of dirt and other material which encourages marine growths.

While there are a considerable number of different kinds of growths, the two which are the most prevalent are the hyacinth and the Florida elodea. Both of these growths can have considerable commercial value. Both contain a high percentage of protein, which is of course a useful and necessary food material. The main reason why these growths have not in the past been developed commercially has been the lack of efficient harvesting machinery, equipment and methods.

The only method for harvesting the growths of Florida now available is by mowing, transferring the moved material to barges, and retransferring to land-based vehicles for transport to some disposal area. As illustrative of this equipment reference is made to the two Ellis Pats. 1,344,624 and 1,344,626. However, each of these devices would be relatively ineffective for the purposes involved herein.

The Ellis Pat. No. 1,344,624 relates to a Caterpillar Tractor Swamp Harvester that will serve to harvest certain marine growths, but it involves an intricate amount of hardware, prone to get out of order and rather limited in its applicability to harvesting only certain growths, with concern expressed as to the non-injury of their roots. It would not be suitable for use in many lakes. Similarly, the Ellis Pat. 1,344,626 involves a barge-like device having a number of closely adjacent circular saw blades operative to cut aquatic growths, but such a device is dangerous to use, does not have versatility or adaptability, and essentially depends upon the buoyancy of these severed growths in order for the recovery apparatus to function properly. Neither of these patented devices could harvest growths in a highly selective manner as taught herein.

The Clark Pat. No. 1,571,395 teaches an apparatus and method for collecting seaweed, and uses a flexible tube designed to be lowered vertically downward at locations where beds of sea weed exist. The patentee creates an upward current in the tube and cuts off the seaweed so it can rise in the tube, but he utilizes no suction arrangement as taught herein, and he could not in a consistent manner remove marine growths that tend to clog canals, or perform the other seaweed removal operations taught herein.

The Bell Pat. No. 2,181,863 teaches the use of rakes in the nature of grapple devices for loosening marine growths and the lifting of the growths by suction, but this arrangement is of a hit and miss type inasmuch as the grapples are moved back and forth with no definite progressive movement for insuring an orderly removal of all growths. This patent is designed to remove the roots, which is of course undesirable where periodic harvesting is desirable. This latter statement is based on the fact that some growths are desirable in that they feed on the nutrients that would otherwise severely contaminate the water and cause algae to accumulate, and only the tops of such growths should be cut.

The Knowlton et al. Pat. No. 2,320,283 is similar in principle to the Clark patent in that the sea moss is raked from the rocks and is brought to the surface by suction. However, this patent, also, would be unable to perform the wide variety of selective harvesting operations of the type taught herein, such as removing only the tops of interfering growths, and allowing the roots to remain.

SUMMARY OF THE INVENTION

The present invention involves a self-propelled floating structure having a partially submerged plate or the like at one end thereof, in which plate is disposed an opening. Pump means are carried upon the floating structure, with suitable interconnecting means being disposed between the opening and the pump means so that marine growths drawn into the opening can be pulled through the interconnecting means and taken aboard the floating structure. Although in some embodiments of my invention the plate is essentially fixed with respect to the floating structure, in accordance with other embodiments, the plate is vertically movable so as to enable the intake opening to be selectively moved nearer to or further from the surface of the body of water. Because of this latter arrangement, my device may be used for a wide range of purposes, including the clearing of beach areas of valueless growths as well as harvesting comparatively deep growing plants for commercial purposes.

The plate at the front of the floating structure may also be movable in an entirely different sense, namely, the plate can be swung around so as to dispose the intake opening in the rearward direction, thus obviating the need for the floating structure to be turned around in order that a return trip across the lake or other body of water may be brought about, and the harvesting procedure continued.

Other facets of my invention include the use of a plurality of jets disposed at selected locations about the periphery of the intake plate, these jets serving to induce the underwater growths to move toward the intake opening. Also, a number of various pieces of apparatus may be carried aboard the floating structure so that the harvested growths can be dewatered, pulverized and compressed for ultimate sale or discard. They also may be chemically or otherwise treated and then put back into the body of water at a comparatively deep location.

It is therefore apparent that my invention serves a wide range of needs and purposes and comprehends a number of constructional techniques that allow it to be used on lakes, waterways, rivers and the like. As is obvious, my device is not limited to use in Florida waters, for it has a wide range of uses and possible environments.

It is a principal object of this invention to provide equipment and methods for harvesting marine growths rapidly and effectively.

It is another object of this invention to harvest these growths in such a manner that they could be easily thereafter converted into a commercially useful product.

It is yet another object of this invention to provide more efficient equipment and methods for removing marine growths from areas where they interfere with boating, fishing, bathing and similar activities, or where they clog streams, canals and other waterways, and their complete removal is desired.

These and other objects, features and advantages of my invention will be more apparent from a study of the enclosed drawings in which:

FIG. 1 is a plan view of a typical floating structure in accordance with my invention, having harvesting equipment as well as processing equipment so that marine growths can be processed aboard the vessel;

FIG. 2 is a side-elevational view of the device in accordance with FIG. 1, with certain portions in cross-section to reveal internal construction;

FIG. 3 is a perspective view of a typical intake arrangement in accordance with my invention, this view showing the control station and a typical power unit;

FIG. 4 is an enlarged fragmentary view of a portion of the device shown in FIG. 3, revealing intake pipe details;

FIG. 5 is a perspective view with certain portions broken away in order to illustrate how jets may be disposed about the periphery of the intake plate to encourage motion of the growths toward the inlet opening;

FIG. 6 is a fragmentary view to a larger scale of a portion of the plate shown in FIG. 5, this view being taken along section line 6—6 in FIG. 5;

FIG. 7 is a front view of a particular inlet plate arrangement;

FIGS. 8 and 9 are cross-sectional views taken at designated locations on FIG. 7;

FIG. 10 is a cross-sectional view of a typical screw compressor arrangement, wherein the liquid constituents of the growths may be separated and recovered, and the relatively solid constituent cut and defiberated.

FIG. 11 is a cross-sectional view taken at a designated location on FIG. 10;

FIG. 12 is a side-elevational view of an embodiment of my invention in which a movable front plate is utilized, this view also depicting how the harvested plants can be processed in the event they are to be returned into the lake;

FIGS. 13 and 14 are related views showing how the vertically movable plate of FIG. 12 may be moved to selected other depths;

FIG. 15 is a perspective view revealing more details of the vertically movable plate arrangement;

FIGS. 16 through 18 depict various floating structure arrangements, involving various processing facilities;

FIG. 19 is a plan view of an embodiment in which the intake plate can be swung approximately 180 degrees to obviate the need for turning the floating structure around; and FIGS. 20 and 21 are fragmentary views related to FIG. 19 and revealing the intake plate swung back into the normal position.

Turning to FIGS. 1 and 2, it will be noted that I have shown a propelled floating structure or barge 1 having a plate or shield 2 in the front thereof. A suitable opening 3 of elongate shape is disposed in the plate below water level, through which marine growths are taken in, these growths entering in the manner shown in FIG. 2 and thereafter flowing along a pipe 4 into suction side of a pump 5. The pump 5 is driven such as by an engine 6 or other motive power. Typically an internal combustion engine is used, which engine can also be used to power certain pieces of ancillary equipment.

Pipe 7 connected to the exit side of the pump 5 delivers the growths upwardly and deposits them upon the upper surface of a movable screen 8 in the nature of a conveyor belt or the like, with the arrangement being such that most of the water drawn through the submerged elongated opening with the growths can drip through the screen and be caught in collecting pan 9. The water is then drained back into the lake or other body of water through a pipe 10. The growths then may be delivered by the conveyor to a shredder 11 or other disintegrating device which operates directly above a perforate screen 11a, with the shredded plants then dropped into a screw press 12 where the liquid constituents of the growths are extracted. The growths 14 are then delivered in solid or semi-solid form, where they are carried by a small conveyor 13 to a delivery platform 14P. A disc type cutter 17 may be employed to cut the compressed growths into blocks so as to simplify handling. The blocks can be transported to other locations for further processing and use. The liquids squeezed out of the plants may be caught in a pan 39 and then delivered by a pump 40 to a storage tank 41 for possible sale or other use.

The barge 1 is moved forward (to the left as shown in FIGS. 1 and 2) by propulsion devices such as the two motors 15 driving suitable propellers. Preferably these are of the type which can be rotated 360 degrees so that they can provide not only for the forward movement of the barge, but control its direction as well. These may be electric motors operated by an engine driven generator 16. Additional propeller mechanisms 15A of the same type can be used when necessary to aid in the barge movement in the desired direction, as in the case of a side wind. These propeller devices are under the control of the operator at station 13′, who also asserts control over other motors and devices of my invention such as the motors 8a and 12a that are used to power the conveyor belt 8 and the screw press 12, respectively.

To place the equipment in operation, the barge is moved to the area from which it is desired to remove the growths, and the pump 5 is started operating. As the barge and the front plate or shield 2 contacts the growths, the strong suction manifested through the elongated opening 3 draws in a large quantity of water, carrying the growths along with it as indicated in FIG. 2. The growths are then processed as described above and hereinafter.

Turning to FIG. 3 it will be noted that in this enlarged showing I have revealed the opening 3 to be of elongated configuration disposed somewhat near the bottom of plate 2, with this opening gradually changing into a generally circular cross-section so as to enter the inlet of the pump; note FIG. 4. It should be observed that the pipe 4 is disposed in a notched front portion of the barge, thus avoiding interference. This figure also reveals in greater detail the control station 13' and the levers and pedals that are provided to enable the operator to move and to operate the barge in the desired manner, such as by operating the motor-driven propeller units 15A.

Referring to FIG. 5 it will be seen that a plurality of jets may be provided around the periphery of the plate 2, and utilized to urge the growths toward the inlet 3. The jets 31 spaced along the lower periphery are angled in the general manner shown in the enlarged cross-section shown in FIG. 6, whereas the jets 30 disposed around the upper portion of the plate are angled to drive the marine growths downwardly toward the elongated inlet. Jets 32 may be used on the edges of the plate, to the left and right of the opening 3, for a similar reason. Suitable tubes 34 disposed upon the pipe 4 are used to carry high pressure water for powering the jets, which can be furnished from a pump (not shown) driven by engine 6, for example. It should be noted that in FIG. 6 I have shown how an elongated blade 33 may be attached along the lower surface of the plate to aid in the severing of the growths, and avoid pulling them up by their roots. It can be a stationary, non-reciprocating blade.

Turning to FIG. 7, I have there revealed in further detail an inlet plate, but in this instance the plate possesses an amount of curvature, rather than being substantially flat, as shown in FIGS. 1–4. This somewhat conical plate may be equipped with jets 30–32 as discussed in connection with FIG. 5, for urging marine growths toward the opening 3. Cross-sectional views of this embodiment are represented in FIGS. 8 and 9. in which figures the jets are shown in further detail.

In FIG. 10 I reveal a typical screw press 12 in greater detail, with numerous openings being provided in the end remote from the inlet for the liquid constituents of the growths to be removed and recovered for further use or disposal. In this view, pan or catch basin 39' is of different configuration than the comparable component in FIG. 2. The compressed growths exit through openings 42 at the right hand side of the screw press, and if desired a grinding action may be there brought about.

Referring now to FIG. 12 it will be noted that an inlet arrangement for marine plants and growths is provided as before, with a pump 5 and engine 6 being provided so that the growths will be sucked into pipe 4 and thereafter delivered from the pump through pipe 7 and thus be deposited upon moving screen 8. From the screen the growths are transported to a location above the cutter or shredder 11 and thence dropped into the shredder, by means of which the growths are cut into small pieces.

In this instance, rather than converting the growths into briquettes, it may be preferable to treat the growths with a chemical dispensed from tank 24 and sprayed by means 26 onto the plants. The spraying is controlled by valve 25 and is preferably done while the plants are being ground up by shredder 11, for this assures the removal of air from the central stems so that the chemical can more readily be received. Thereafter, the treated plants are allowed to fall down through a large pipe 20 that passes through deck opening 21 of the barge, and enters the lake or other body of water at a sufficiently deep location that this refuse will be out of contact with bathers and fishermen, and sufficiently deep that it will not likely be in a position to be harvested a second time. The movable tube 23 enables the depth of depositing of the plants to be closely adjusted.

It should also be noted in FIG. 12 that an actuator 37, which may be in the nature of a hydraulic actuator or an electric screw jack, may be affixed adjacent a forward portion of the inlet pipe, with the movable portion of the actuator being connected to a portion 4a of the inlet pipe that is in telescopic relation with a larger, upper portion of the inlet pipe 4'. This movable portion of the inlet pipe is movable over a comparatively wide range of positions with respect to the fixed portion of the inlet pipe, with the arrangement being such that a portion 19 of the front plate or shield is movable therewith at the behest of the operator.

Reference should be made to FIG. 15 wherein these details are depicted to a larger scale. In this latter figure it will be noted that a pair of arms 18a support the fixed portion 18 of the plate extending from one side to the other across the front of the barge, with movable plate portion 19 being shown to be vertically slidable with respect to this fixed portion. As a consequence of the vertical movements of the portion 19 brought about by selective movements of the actuator, the inlet 3 is caused to move closer to or further from the surface of the water. Fluid pressure (or electric current) for operating the actuator 37 is supplied by the ancillary devices referred to hereinbefore.

Where it is desired to "skim" off the growths lying on the water surface, which growths may have begun to decay, the movable section can be used in the position shown in FIG. 13. These growths are seldom suitable for further use, and may be dewatered and cut or shredded and disposed of generally for compost. Alternatively, they may be returned to the lake or other water area, these being projected through the tube 20, 23.

On the other hand, the movable inlet portion 19 may be moved to the positions shown in FIGS. 12 and 14, in which position my device can serve to clear canals and waterways in a very effective manner. Growths possessing commercial value may of course be converted into briquette form as described in connection with FIGS. 1 and 2.

To be practical, the entire process must be streamlined as far as economically practicable. To illustrate some of the methods which may be used to accomplish this, reference is made to FIGS. 16, 17 and 18. In FIG. 16 is illustrated the equipment already described for collecting dewatering, shredding and compressing of growths into reasonably finely divided solid form. This material can then be transferred by a conveyor 44 to equipment on a trailing boat or barge 61. The equipment shown consists of a dryer or thermal dehydrator 46, the material being carried through the dryer by conveyor 45 and emerging on conveyor 47. From here it may be taken through a cooling area on conveyor 49, with a fan 48 typically being used for the purpose of cooling. It may then be delivered by suitable conveyor 51 to a packing area 52.

Under certain conditions it may be desirable for the growths material collected as shown in FIGS. 1 and 2 to be transported to a central and probably land based plant for conversion into a final product. This would enable a larger and probably more efficient operation as material could be delivered to it from a number of floating collectors. One method would be for the cut and shredded material to be delivered as a thick semi-liquid to a floating tank as indicated by FIG. 17.

In FIG. 17, the material from disintegrator 11 is collected in a bin 62 used in place of the screw press 12. From this bin 62 the material is delivered by a pump and pipe 63, 64 to a storage bin 65 mounted on a barge 71 for transportation to shore based drying, packing and other equipment. Water may be added to the material in bin 62 to facilitate pumping.

Another optional arrangement is to have as shown in FIG. 18 the material from the screw press 12 or from the device shown in FIG. 10 to be delivered by conveyor 82 to bins 83 located on barge 81 for transportation to shore based equipment. In this case the bins 83 may be transferred to trucks or other transport equipment for delivery to some inland point for further processing or use.

The equipment heretofore shown, particularly in FIGS. 1 and 2, show means for collecting or harvesting the marine growths, moving in one direction only. This requires that the complete equipment be turned around before a return pass can be made.

It is the purpose of the modification shown in FIGS. 19–21 to allow the complete combination of equipment to collect the growths while moving in either direction. To accomplish this, the collecting shield or plate 2, instead of being affixed directly on or to the front end of the barge 1, in hinged to the barge at one end, and provision made for swining the entire collecting structure 180 degrees relative to the barge 1. A mounting bracket is secured to the side of the barge 1 at the front end, and two bearings 92 are mounted thereon, as shown in FIG. 20. Secured to the end of the collecting shield 2 are two pivot bearings 91, thereby permitting the shield to be moved from the position on the front of the barge shown in FIGS. 20 and 21, to the position shown in FIG. 19.

This movement may be accomplished by the gear segment 100 affixed to the upper shield pivot 91, with the rotation of the gear segment and shield being accomplished by a pinion gear 101 selectively operated by any suitable means (not shown). When in the position shown in FIG. 19, the shield may be held firmly by a removable brace or tie 96.

To provide for a pipe connection between the collecting slot 3 in the shield 2 and the suction pump 5 for both positions of the shield, and any position in between, the pipe is provided with an off-set as shown at 97 and connected to a swivel or rotary pipe joint 94 which is located above and directly in line with the pivot bearings 91 on the shield 2. From the rotary pipe joint 94 a second pipe 98 is connected directly to the suction side of the pump 5. It will thus be seen that the collection of marine growths can proceed at all times under the control of the operator, regardless of the shield position.

It should be borne in mind that I am not to be limited to the precise physical arrangements shown in any one drawing of this case. For example, the jets shown in connection with FIGS. 5–9 may be used in the embodiment of FIG. 1, the arrangement shown in FIG. 12 at 23–26 may be used subsequent to a grinding procedure as shown in FIG. 10, or the movable front plate shown in FIGS. 12–15 or in FIGS. 19–21 may be used in conjunction with any of the embodiments of this case.

A novel method in conjunction with this invention may involve the steps of drawing the growths aboard the floating structure, dewatering the growths, and then compressing the growths into a form for sale or disposal. Alternatively, the growths can be treated and then returned to a deep location in the body of water, or else placed in semi-liquid form in storage bins for subsequent treatment. The liquid evolved during the various steps may be either retained or dumped overboard.

I claim:

1. Apparatus for harvesting marine growths from a body of water, comprising a floating structure, a substantially vertical plate disposed on said structure and having at least one submerged inlet opening therein, pump means disposed on said structure, interconnection means between said pump and said plate at a location adjacent said inlet opening, said pump means creating a suction at the submerged inlet opening of said plate that marine growths encountered are sucked into said inlet opening, conveyed through said interconnection means, and taken aboard said floating structure.

2. The apparatus as defined in claim 1 in which said plate is essentially fixed with respect to said floating structure.

3. The apparatus as defined in claim 1 in which at least a portion of said plate is movable vertically so as to enable said opening to be selectively moved nearer to or farther from the surface of said body of water.

4. The apparatus as defined in claim 1 in which said plate is pivotally movable with respect to said floating structure so as to enable said opening to be disposed in a growth collecting direction, irrespective of the direction of travel of said floating structure.

5. The apparatus as defined in claim 1 in which a stationary cutting blade is disposed along a lower portion of said plate, to accomplish a severing of marine growths without root damage.

6. The apparatus as defined in claim 1 in which a plurality of jets are disposed around the periphery of said plate, for inducing marine growths to move toward said opening.

7. The apparatus as defined in claim 1 in which means are provided for dewatering, pulverizing and compressing the marine growths aboard said floating structure.

8. The apparatus as defined in claim 1 in which means are provided aboard said floating structure for treating unusable marine growths, and for putting them back in said body of water at a comparatively deep location.

9. The apparatus as defined in claim 1 in which means are provided for the dewatering and drying of the marine growths while on board the floating structure.

10. The apparatus as defined in claim 1 in which means are provided for pulverizing the marine growths, and for placing them in storage vessels in a semi-liquid state.

11. The apparatus as defined in claim 1 in which means are provided for compressing the growths, with means also being provided for retaining the liquid extracted during such procedure.

References Cited
UNITED STATES PATENTS

| | | | |
|---|---|---|---|
| 1,481,177 | 1/1924 | Bayard et al. | 56—9 |
| 2,023,696 | 12/1935 | Kertzman | 37—58 |
| 2,181,863 | 12/1939 | Bell | 56—9 |
| 2,320,283 | 5/1943 | Knowlton et al. | 56—9 |
| 2,673,436 | 3/1954 | Urban | 56—12 |
| 2,716,318 | 8/1955 | Skromme | 56—1 |
| 2,907,162 | 10/1959 | Rebikoff | 56—9 |

RUSSELL R. KINSEY, Primary Examiner